United States Patent Office 3,737,476
Patented June 5, 1973

3,737,476
METHOD OF PREPARATION OF POLYMERS OF PROPYLENE AND/OR BUTYLENES
Jean Claude Bailly, Martigues, France, assignor to Naphtachimie, Paris, France
No Drawing. Filed Sept. 21, 1970, Ser. No. 74,224
Claims priority, application France, Sept. 25, 1969, 6932683
Int. Cl. C07c 3/10
U.S. Cl. 260—683.15 D                                8 Claims

ABSTRACT OF THE DISCLOSURE

The polymerization of propylene and/or butylenes to produce liquid polymers in high yield and with a high reaction rate in which the monomer or monomers are reacted in the presence of an inert solvent containing in suspension catalytic substances formed of halogenated derivatives of titanium and/or vanadium, organo-aluminum compounds and halogenated derivatives of methane and/or ethane.

---

This invention relates to the preparation of polymers of propylene and/or butylenes, which are liquid at ambient temperature.

It is known that low molecular weight liquid polymers may be prepared from alkenes by fractionation of mixtures of polymers prepared by polymerisation of such alkenes in the presence of Lewis type catalysts, such as aluminium chloride, or more complex catalytic systems which comprise organo-aluminum derivatives. These catalysts generally yield mixtures of polymers in which the molecular weights vary widely, including light oils, medium oils, waxes and even solid polymers.

Fractionation of these polymer mixtures consequently results in the formation of by-products in addition to the desired oily polymers.

By effecting the polymerisation under particular conditions, it is possible to reduce the formation of such by-products, but this selectivity in polymerisation frequently brings about a material reduction in the speed of the reactions and consequently in the amount of oily polymers obtained. This obviously is prejudicial to the industrial use of these methods.

It is an object of this invention to produce and to provide a method for producing oily polymers of propylene and/or butylenes in which the amount of waxy or solid compounds is reduced and which still give a high rate of productivity.

The invention therefore concerns a method for the preparation of polymers of propylene and/or butylenes, having mean molecular weights of from 100 to 1000, and which are liquid at ambient temperature. In accordance with the practice of this invention, the polymerisation of propylene and/or butylenes is effected in an inert solvent containing, in suspension, solid catalytic substances formed from halogenated derivatives of titanium and/or vanadium, halogenated derivatives of methane and/or ethane, and organo-aluminum compounds having the general formula $AlR_{3-n}X_n$, in which R represents an alkyl group, X represents a halogen such as chlorine, bromine or iodine, and $n$ is a number between 0 and 2.

The halogenated derivatives of titanium and/or vanadium are preferably in the form of the chlorides or oxychlorides of these metals in their maximum valency state or in a state of lower valency. Titanium trichloride is particularly suitable, but the invention is not limited to this compound and other titanium or vanadium chlorides or oxychlorides can be used with equal satisfaction, such as titanium tetrachloride, vanadium tetrachloride, vanadium trichloride, and pentavalent vanadium oxychloride.

The organo-aluminum compounds having the formula $AlR_{3-n}X_n$ are preferably selected from chlorinated compounds, such as monoalkylaluminium dichlorides, dialkylaluminium chlorides, trialkylaluminiums in which the alkyl radical is preferably ethyl or butyl but may be an alkyl radical having from 2–8 carbon atoms.

The halogenated derivatives of methane and/or ethane are preferably selected from chlorinated derivatives of ethane and/or methane, such as carbon tetrachloride, chloroform and 1,2-dichloroethane.

The solid catalytic substances are advantageously prepared under conditions such that the amount of organo-aluminum compounds, per litre of solvent of the polymerisation medium, is from 1 to 100 millimols and preferably about 10 millimols, the amount of halogenated titanium and/or vanadium derivatives to the organo-aluminum compounds is in a molecular ratio of from 0.05 to 5 and preferably about 0.5, and the amount of halogenated methane and/or ethane derivatives, with respect to the organo-aluminum compounds, is in a molecular ratio of from 1 to 100, and preferably in the range of 10 to 25.

By way of example of one embodiment of the invention, the three catalytic substances specified above are introduced, in the stated proportions and at ambient temperature, into an inert solvent, such as a hydrocarbon of petroleum origin. A precipitate is formed which settles out over a period of from a few minutes to a few hours. This precipitate is then separated from the inert solvent and re-suspended in a further amount of solvent into which the propylene and/or butylenes to be polymerised are progressively introduced with agitation, preferably at a temperature within the range of 10° to 90° C. and under a pressure of from 1 to 5 bars.

The operation is continued under these conditions over a period of time which may extend up to some 10 hours, depending on the desired amount of polymer. It has been found that it is possible substantially to vary the reaction period, and also the amounts of catalytic subtsances used, within the above specified limits, and to produce oily polymers without substantial amounts of waxy or solid substances being formed. When the desired amount of oil is produced, the reaction is stopped by means of degassing. The reaction medium is cooled and then mixed with water to cause the catalytic substances to decompose. The aqueous phase is separated by decantation. The catalytic residues are separated by filtration of the organic phase, and then the polymer is separated from the solvent, as by rectification under reduced pressure.

It is possible, by the above described mode of operation, to prepare in the concentrated state a catalyst which is capable of being preserved when protected from exposure to air. This catalyst can be divided into a number of fractions for use in different operations to ensure an excellent degree of reproducibility for these operations.

In an alternative embodiment, it is possible to introduce the catalytic substances into an inert solvent and to use the resulting suspension directly in the method of the invention, without separating the catalyst. Obviously, this mode of operation does not permit the preparation of a concentrated catalyst which can be used in a number of operations.

It has been found that it is possible to produce catalysts which are even more reactive, and which consequently result in larger amounts of oily polymers, when the catalyst is raised to a temperature of the order of from 60° to 80° C. over a period of some tens of minutes before introducing the alkenes to be polymerised.

The method of the invention makes it possible, at high rates of productivity, to produce large amounts of oils which contain neither waxes nor solid polymers. These oils, having mean molecular weights less than 1000, and frequently between 450 and 650, are capable, directly or after hydrogenation, of various uses and particularly for use as hydraulic fluids.

The following examples are given by way of illustration and not by way of limitation, of the practice of this invention.

EXAMPLE 1

1.6 g. of monoethylaluminium dichloride, 1.4 g. of titanium trichloride and 77 g. of carbon tetrachloride are introduced, at ambient temperature, into 2 liters of n-heptane. This preparation is left at rest at ambient temperature for 63 hours and then the formed black precipitate is separated by decantation, washed with 4 liters of n-heptane, and then re-suspended in a little n-heptane.

Half this suspension is then removed, and transferred into a stainless steel reaction vessel having a capacity of of 5 litres, together with 2 litres of n-heptane; the mixture is then heated to 60° C. and the operation of introducing propylene into the agitated suspension is then begun, under an effective pressure of 5 bars. After 6 hours of reaction, the reaction vessel is degassed and cooled. The contents of the reaction vessel are transferred into a glass balloon flask and 100 g. of water is added with agitation. The mixture is filtered in order to remove the catalyst residues and then the solvent and water are removed by distillation under a pressure of a few millibars.

1400 g. of a polypropylene oil is obtained, having a mean molecular weight of 560, a density of 0.84 g./ml., a bromine index of 23 and a viscosity index of 73, measured in accordance with the standard ASTM D 567–53. The viscosity index of the oily polymers prepared in the following examples is measured in accordance with the same standard.

In order to verify that only the ingredients which precipitate during preparation of the catalyst, and not the substances which remain dissolved in the solvent, have a catalytic activity, the solvent which is decanted in the course of preparation of the catalyst is transferred into a reaction vessel identical to the previous reaction vessel, and the attempt is made to polymerise proplene therein, under the same conditions as those described above. After 6 hours of treatment followed by separation of the solvent and washing water, it is found that no polymer has been formed.

EXAMPLE 2

2 liters of n-heptane, 3 g. of diethylaluminium chloride, 1.4 g. of titanium trichloride and 77 g. of carbon tetrachloride, are introduced into a 5 litre stainless steel reaction vessel. The reaction vessel is heated to 60° C. and propylene is introduced progressively under a pressure of 5 bars. The reaction is stopped at the end of 6 hours and the polymer is isolated as in Example 1.

1500 g. of a polypropylene oil is collected, having a mean molecular weight of 560, a density of 0.84 g./ml., a bromine index of 84, and a viscosity index of 56.

By way of comparison, the same test as above is repeated, but without introducing any titanium trichloride; no polymer is formed.

Also by way of comparison, the same test is repeated except 1 litre of carbon tetrachloride is used as the polymerisation solvent. After 6 hours of reaction at 10° C., the polymer formed is isolated as above. Only 70 g. of a polypropylene oil is collected, having a mean molecular weight of 460.

EXAMPLE 3

Use is made of 2 liters of n-heptane with a catalytic system formed from 2.3 g. of monoethylaluminium dichloride, 0.16 g. of titanium trichloride and 7.7 g. of carbon tetrachloride, and the process is otherwise the same as in Example 2.

After 5 hours of reaction at 60° C., 1150 g. of a polypropylene oil is obtained, having a mean molecular weight of 630, a density of 0.83 g./ml., a bromine index of 24, and a viscosity index of 40.

By way of comparison, a similar test is effected, using 14.6 g. of titanium trichloride and 7.7 g. of carbon tetrachloride, but without adding any organo-aluminum compound. After 6 hours of reaction at 60° C., it is found that no polymer has been formed.

Also by way of comparison, a similar test is effected, using 2.9 g. of monoethylaluminium dichloride, 14.6 g. of titanium trichloride, but without adding any carbon tetrachloride. Only 22.5 g. of a waxy polypropylene, without any polypropylene oil, is collected.

EXAMPLE 4

(a) Polymerisation of the propylene is effected using a catalytic system formed of 2.5 g. of triethylaluminium, 1.4 g. of titanium trichloride and 77 g. of carbon tetrachloride in 2 liters of n-heptane. Without leaving the catalyst to rest, the suspension is heated to 60° C. and propylene is introduced under an effective pressure of 5 bars. After 5 hours of reaction, the polymer is isolated, comprising 960 g. of a polypropylene oil having a mean molecular weight of 550, a density of 0.83 g./ml., a bromine index of 24 and a viscosity index of 83.

(b) The test described in (a) is repeated, except that the catalytic system is left at rest for 63 hours at ambient temperature before the propylene is introduced. After 6 hours of reaction, 1560 g. of a polypropylene oil is collected, having a mean molecular weight of 460, a density of 0.82 g./ml., a bromine index of 27 and a viscosity index of 81.

EXAMPLE 5

Polymerisation of propylene is carried out using a catalytic system formed of 3.5 g. of triisobutylaluminium, 1.4 g. of titanium trichloride and 7.7 g. of carbon tetrachloride, in 2 liters of solvent with the normal rest. After 6 hours of reaction at 60° C., 530 g. of a polypropylene oil is collected, having a mean molecular weight of 580, a density of 0.8 g./ml., a bromine index of 24 and a viscosity index of 43.

EXAMPLE 6

1-butene is polymerised by means of a catalytic system formed from 2.9 g. of monoethylaluminium dichloride, 1.4 g. of titanium trichloride and 15.4 g. of carbon tetrachloride, in 2 liters of solvent. The catalyst is left to rest for 12 hours at ambient temperature, then the reaction vessel is heated to 60° C. and 1-butene is introduced under a pressure of 2 bars. After 4 hours of reaction, 660 g. of a 1-polybutene oil is collected.

EXAMPLES 7 TO 10

Propylene is polymerised in 2 liters of solvent in the presence of catalytic systems formed from 2.3 g. of monoethylaluminium dichloride, 7.7 g. of carbon tetrachloride and 2.25 millimols of one of the compounds of titanium or vanadium, as indicated in the following Table I. After 6 hours of reaction at 60° C., the polypropylene oils formed are collected, the mean molecular weights of which are given in Table I.

EXAMPLE 11

Propylene is polymerised in the presence of a catalytic system formed of 2.9 g. of monoethylaluminium dichloride, 1.4 g. of titanium trichloride and 13 g. of chloroform, in 2 liters of solvent. After 6 hours of reaction at 60° C., 680 g. of a polypropylene oil is obtained, which has a mean molecular weight of 590, a density of 0.8 g./ml., a bromine index of 28 and a viscosity index of 70.

EXAMPLE 12

The reaction is carried out as in Example 11, except that chloroform is replaced by 99 g. of 1,2-dichloroethane. 580 g. of a polypropylene oil is collected, which has a mean molecular weight of 580, a density of 0.8 g./ml., a bromine index of 28 and a viscosity index of 70.

TABLE I

| Example No. | Titanium or vanadium compound | Amount of polymer obtained (g.) | Mean molecular weight |
|---|---|---|---|
| 7 | TiCl$_4$ | 690 | 600 |
| 8 | VCl$_4$ | 1,200 | 550 |
| 9 | VCl$_3$ | 600 | 580 |
| 10 | VOCl$_3$ | 1,100 | 580 |

It will be apparent from the foregoing that a novel, simple and more efficient method and means are provided for the polymerisation of low molecular weight alkenes in the production of oily or liquid polymers in high yields and reaction rate without excessive production of waxy or solid polymers.

It will be understood that changes may be made in the details of formulation and operation, without departing from the spirit of the invention, especially as defined in the following claims.

I claim:

1. A method for preparing polymers of propylene and/or butylenes which are liquid at ambient temperature, comprising polymerizing propylene and/or butylenes in an inert solvent containing in suspension solid catalytic substances formed of vanadium trichloride or titanium trichloride, organo-aluminum compounds having the general formula AlR$_{3-n}$X$_n$, in which R represents an alkyl group, X represents a halogen, and $n$ is a number between 0 and 2, and halogenated methane in which the amount of organo-aluminum compound is from 1 to 100 millimoles per liter of solvent, the amount of titanium trichloride and/or vanadium trichloride is such that the molar ratio thereof and the organo-aluminum compound is from 0.05 to 5, and the amount of halogenated methane is such that the molecular ratio between same and the organo-aluminum compound is from 1 to 100.

2. A method as claimed in claim 1 in which the prepared polymer has a mean molecular weight within the range of 100–1000.

3. A method as claimed in claim 1 in which the halogen is selected from the group consisting of chlorine, bromine and iodine.

4. A method as claimed in claim 1 in which the alkyl group has from 2–8 carbon atoms.

5. A method as claimed in claim 1, in which the amount of organo-aluminum compounds is about 10 millimols per litre of solvent, the amount of halogenated titanium and/or vanadium derivatives is such that the molar ratio between said derivatives and the organo-aluminum compounds is about 0.5 and the amount of halogenated methane is such that the molecular ratio between said halogenated methane and the organo-aluminum compounds is within the range of 10 to 25.

6. A method as claimed in claim 1 in which the catalytic system is prepared by introducing the three components into an inert solvent, separating the precipitate that is formed and then re-suspending the precipitate in an inert solvent before the introduction of the propylene and/or butylenes to be polymerised.

7. A method as claimed in claim 1 in which the catalytic system is maintained at ambient temperature over a period of from a few hours to a few days, before the introduction of the propylene and/or butylenes to be polymerised.

8. A method as claimed in claim 1 in which the catalytic system is maintained for a short period of time at a temperature within the range of 60°–80° C. before the introduction of the propylene and/or butylenes to be polymerized.

References Cited

UNITED STATES PATENTS

| 3,413,376 | 11/1968 | Cleary | 260—683.15 |
| 3,312,748 | 4/1967 | Johnson | 260—683.15 D |
| 2,935,542 | 5/1960 | Minckler et al. | 260—683.15 |
| 2,907,805 | 10/1959 | Bestian et al. | 260—683.15 |
| 2,967,206 | 1/1961 | Stuart et al. | 260—683.15 |
| 2,993,942 | 7/1961 | White et al. | 260—683.15 |

PAUL M. COUGHLAN, JR., Primary Examiner

U.S. Cl. X.R.

252—429 A